United States Patent [19]

Fernow et al.

[11] Patent Number: 4,475,192
[45] Date of Patent: Oct. 2, 1984

[54] DATA PACKET FLOW CONTROL SCHEME FOR SWITCHING NETWORKS

[75] Inventors: James P. Fernow, Red Bank; Roger P. Levy, East Windsor, both of N.J.

[73] Assignee: AT&T Bell Laboratories, Murray Hill, N.J.

[21] Appl. No.: 349,032

[22] Filed: Feb. 16, 1982

[51] Int. Cl.³ .............................................. H04J 6/00
[52] U.S. Cl. ........................................ 370/94; 370/60
[58] Field of Search ............... 370/94, 60; 340/825.52

[56] References Cited

U.S. PATENT DOCUMENTS

| | | | |
|---|---|---|---|
| 4,074,232 | 2/1978 | Otomo et al. | 370/60 |
| 4,079,209 | 3/1978 | Schwerdtel | 370/60 |
| 4,380,063 | 4/1983 | Janson et al. | 370/60 |

OTHER PUBLICATIONS

"Analysis of Flow-Control In Switched Data Network By a Unified Model" By Pujolle, In Evolutions In Computer Communications, pp. 123-128, 1978.
"Methods, Tools & Observations On Flow Control In Packet-Switched Data Networks" by Pouzin, in IEEE Trans. On Communications, vol. Com-29, No. 4, Arp. 1981, pp. 413-426.

Primary Examiner—Douglas W. Olms
Attorney, Agent, or Firm—Roy C. Lipton

[57] ABSTRACT

Flow of data packets through virtual circuits in a multinode packet switching network is controlled by authorizing packets to enter and to leave each node. When a packet entering a node does not have an authorization (credit) to leave, it is placed in a pool of buffers common to all virtual circuits to await reception of an output credit for the virtual circuit. To avoid buffer congestion, a count is maintained of packets presently stored in and being processed through the node and packets tha the node anticipates it will receive. If the count exceeds a predetermined threshold, a packet cannot get an authorization to enter the node unless it has a credit to leave. If the count is below the threshold, credits are granted for packets to enter the node even though there is no authorization to leave.

9 Claims, 10 Drawing Figures

DATA PACKET FLOW CONTROL SCHEME FOR SWITCHING NETWORKS

TECHNICAL FIELD

This invention relates to packet switching systems and, more particularly, to control of data flow through nodes of such systems to avoid congestion.

BACKGROUND OF THE INVENTION

Packet transmission is characterized by the technique of disassembling, at the sending subscriber's end of a network, the data of the sending subscriber or user for insertion into separate bursts or packets and, at the other end of the network, reassembling the data from the packets for delivery to the receiving user. This type of transmission is especially useful in common carrier or time shared switching systems since the circuit or path resources required for the data transmission of the user need only be available while a packet is being forwarded through the network and such resources are therefore available to other users for their paths or circuits in the periods intervening the transmission of such packets.

The resources which may be shared in packet networks include transmission lines (i.e., transmission bandwidth), processors, ports and data or packet buffers. In large multinode networks, serving a plurality of geographically separated users, each node or packet switch accommodates many such ports terminating paths which extend to users and to other nodes. In addition, each node may include one or more processors which, among other functions, route and process packets through the node. Each node may further include many buffers for storing packets in anticipation of such routing or awaiting availability of an output port. Each line between nodes or extending to users may serve a plurality of "calls" and thus accommodate a corresponding plurality of paths or circuits. For such large networks, sharing such facilities results in substantial savings of the total amount of resources required for the system.

One of the problems in large packet transmission or packet switching networks arises when many users attempt to utilize the network at the same time. This results in the formation of many paths or circuits for routing the data and the resources become congested and thus unavailable to a user or to the user's packet when it is being forwarded through the network. It has been found that congestion tends to spread through the network, if uncontrolled, rendering the network unavailable to the various users.

In various previous studies of resource congestion it has been found that one of the principle areas of investigation is congestion of packet buffers, particularly where the buffers become unavailable to incoming packets. One solution of the packet buffer congestion problem is to halt all incoming traffic to the node on all incoming lines when the packet buffers become congested (filled) and no buffers are available for further incoming packets. This method is unsatisfactory since it not only stops incoming packets on heavily used paths but also stops incoming packets from users who originate only a small amount of data flow and therefore do not substantially contribute to buffer congestion.

Another method comprises a credit system which limits the data flow through each of the paths or circuits. One such credit system is termed an end-to-end flow control system wherein the ultimate terminating terminal issues a limited number of credits to the network corresponding to the number of packets that the terminal is willing to receive. Each node upon receiving (being granted) such a credit from a remote receiver unit terminating the node output path or circuit sends or grants a credit to the remote sender unit terminating the corresponding node input path or circuit. Accordingly, for each path, at any instant of time, the number of output credits should equal the sum of the number of input credits plus the number of packets presently being processed through the node. This credit system of receiving or being granted credits from the output path (called an output window mechanism) and granting credits to the input path (called an input window mechanism) results in limiting the data flow through the individual path or circuit to substantially reduce the possibility of buffer congestion in the node. The credit method, however, cannot guarantee freedom from buffer congestion and, at the same time, tends to reduce data flow to the point where the node resources are not amply utilized. In addition, since credits are advantageously carried by packets flowing in the reverse direction, a congested node may not be able to accept the credit carrying packets and may therefore remain indefinitely unavailable (deadlocked) with respect to granting credits to input paths.

Accordingly, it is an object of this invention to control data flow through a node to avoid congestion. It is a more specific object of this invention to utilize a data flow mechanism for each path or circuit which avoids node congestion while more fully utilizing node resources. It is an additional object of this invention to employ a credit mechanism which is not subject to network deadlock.

SUMMARY OF THE INVENTION

In accordance with this invention, the quantity of node congestion is determined in accordance with the quantity of data packets from all paths being processed through the node. Credits are granted to the sender unit on each input path limited to a selected number when the node congestion quantity exceeds a predetermined threshold. A further number of credits are granted to the sender unit in excess of the selected number when the node congestion quantity falls below the threshold. The node thus accepts a limited number of packets even though the congestion threshold is exceeded.

The node congestion quantity is increased when credits are granted to the sender units and is decreased when credits are received from receiver units. Determination of node congestion quantity is thus advantageously dependent on such factors as the number of packets that the node anticipates that it will receive and the number of packets that the node anticipates it can send on, in addition to the number of packets being processed through the node.

In accordance with a specific embodiment of this invention disclosed hereinafter, the input window mechanism is arranged to grant a credit when the difference between the number of unsatisfied output credits held by the node for the path and the number of packets being processed by the node for the path exceeds the number of unsatisfied credits granted to the sender unit and is further arranged to add an incremental number to such difference number when the quantity of node activity is below the threshold.

The foregoing and other objects and features of this invention will be more fully understood from the following description of an illustrative embodiment thereof taken in conjection with the accompanying drawings.

DETAILED DESCRIPTION

Figure 1:
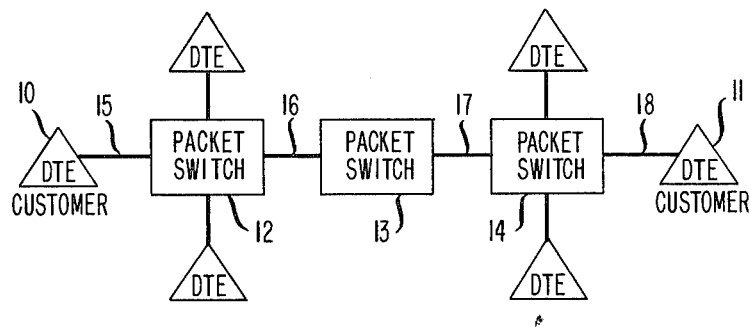
FIG. 1 discloses in block form a packet switching system which advantageously accommodates the present invention.

A data switch network utilizing this invention is shown in FIG. 1. This network interconnects various customer data terminal equipments (DTE), such as DTE 10 and 11, by way of packet switches, such as packet switches 12, 13 and 14. A path then might extend from customer DTE 10 to customer DTE 11 by way of line 15, packet switch 12, line 16, packet switch 13, line 17, packet switch 14 and line 18. Each packet switch may also be connected to other DTE's and other packet switches by way of other lines.

A "call" from customer DTE 10 to customer DTE 11 constitutes a plurality of serial data packets flowing by way of the above-described path. For the purpose of describing this invention, consideration may be limited to data packets flowing in one direction, from customer DTE 10 to customer DTE 11, the packets thus flowing through line 15 and then routed through packet switch 12 to line 16 and thereafter routed through packet switches 13 and 14 over lines 17 and 18 to customer DTE 11. Of course, packets could correspondingly be originated at customer DTE 11 and flow in the reverse direction to customer DTE 10. The network resources for the path for this "call" is, of course, shared with other calls, the connection being commonly known as a virtual circuit and the term path and virtual circuit will hereinafter be used interchangeably as constituting the resources used by the call.

In addition to the flow of the data packets by way of the above-described path, acknowledgement packets also flow in the reverse direction, which acknowledgement packets may have various uses, such as used by mechanisms that control rate of flow of the data packets in accordance with the invention. The flow control mechanism may be implemented in any one or all of packet switches 12, 13 and 14 and acknowledgement packets may be generated at any one or all of packet switches 12, 13 and 14 and at customer data terminal equipment 11. The flow control mechanism will be described, however, as implemented in one of the several packet switches such as, for example, packet switch 13 where data packets are being received from line 16 and acknowledgement packets are being received from line 17. Packet switch 13, in turn, sends data packets onto line 17 and returns acknowledgement packets to line 16.

It is to be understood that lines 16 and 17 may accommodate frames of data traveling in both directions, which frames may carry data packets and acknowledgement packets for many different calls or virtual circuits and therefore each line may be considered as constituting many different paths for the accommodation of calls from many different customer data terminal equipments. Advantageously, each flow control mechanism in packet switch 13 controls the flow on an individual path or virtual circuit (for an individual cell) using a well-known device known as a "window" which defines the flow rate.

Two windowing mechanisms are provided in the packet switch for each path or virtual circuit. Specifically, one windowing mechanism specifies the number of packets that remote equipment (such as packet switch 12) terminating the prior line or link (such as line 16) can send over the specific path to packet switch 13, which window is characterized as the input window. Packet switch 13, therefore, is arranged to send to packet switch 12 acknowledgement packets granting packet switch 12 appropriate credits to send individual packets defined by the input window mechanism. Packet switch 13 also has an output window mechanism which specifies the number of packets that packet switch 13 can send onto line 17 for the individual path or circuit. The manner in which the various equipments and switches send packets in accordance with credits thereby obtained and route the packets by way of the various switches is well known in the art and will not be further described. The subsequent description, however, will be directed to the manner in which the number of credits are determined in accordance with data packets received on an individual path or circuit, credits received in acknowledgement packets received in the opposite direction on that circuit or path and certain internal processes.

Figure 2:
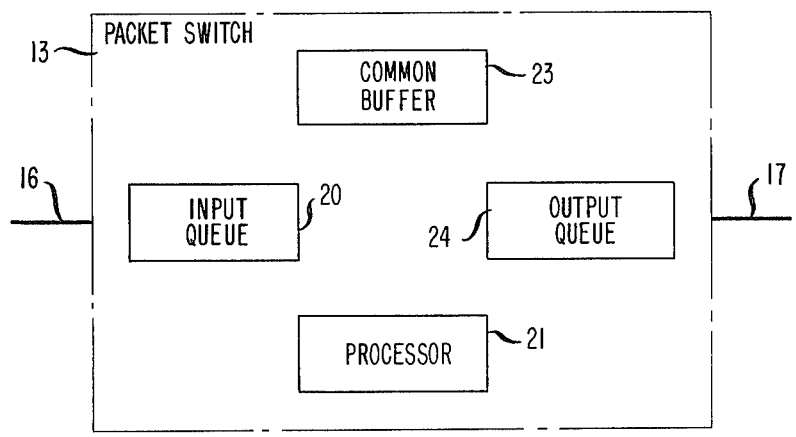
FIG. 2 shows in block form the architecture of a node of the packet switching system.

FIG. 2 symbolically shows certain general functions or processes of a packet switch such as packet switch 13. In general, considering one path (or circuit or call), data packets received from such path on line 16 are "assembled" by input queue 20, which packets are then processed by processor 21. Processor 21 optionally passes the packets to output queue 22 for passage to such path on line 17 (if the output window is satisfied that an appropriate credit exists) or to common buffer 23 in the absence of such credit. Thereafter, when the output window grants one or more credits such buffered packets are passed onto output queue 22 and thence to path 17.

In the reverse direction, acknowledgement packets are received from such reverse path on line 17 for processing by processor 21. A function of processor 21 is to define the number of credits to be granted to the prior link on line 16. This credit number is determined in accordance with such factors as the number of credits already granted to the prior link (the input window), the number of credits granted by the subsequent link (the output window), the number of packets currently being processed through processor 21 and common buffer 23.

In accordance with the invention, additional credits will be granted by the input window to the prior link when the following equality is satisfied:

$$A_{in}+1 \leq A_{out}-B+\Delta, \quad (1)$$

where $A_{in}$ is the number of credits presently granted by the input window, $A_{out}$ is the number of credits presently granted by the output window mechanism, B is the number of packets being internally processed for the path or link by packet switch 13 through input queue 20, processor 21 and output queue 22 and/or is the number of packets stored in buffer 23 for the individual call, and $\Delta$ is a dynamic number value (dependent on node congestion) which defines the number of additional packets the node is willing to accept without having output credits for subsequently forwarding such packets, subject to the conditions that $A_{in}$ and $A_{out}$ cannot exceed a predetermined maximum number of permissible credits and $\Delta$ cannot exceed a predetermined maximum number (Y) of packets. In addition in accordance with the invention, a maximum amount of node congestion can be readily accommodated by the node for all of the calls on all of the various virtual circuits or paths through packet switch 13, which maximum amount is related to the sum of all packets the node will accept plus the sum of all accepted packets not having credits to leave, which maximum number may be defined by an upper limit L. Accordingly:

$$\Sigma[A_{iin}-A_{iout}+B_i] \leq L, \quad (2)$$

where the updated sum defined by the lefthand side of equation (2) is hereinafter referred to as the holding buffer and authorization count and subject to the condition that the node congestion number contributed by each path cannot be less than "0". As discussed hereinafter, dynamic value $\Delta$ is set to a limited value (such as "0") when node congestion exceeds "L" and to a value in excess of "0" when node congestion is less than "0". The functions of processing the number of credits granted by the input and output windows, the function of updating the holding buffer and authorization count and the functions of assuring that the above-identified equalities are maintained are the responsibility of processor 21 which complies with this responsibility as described in detail hereinafter.

Figure 3:
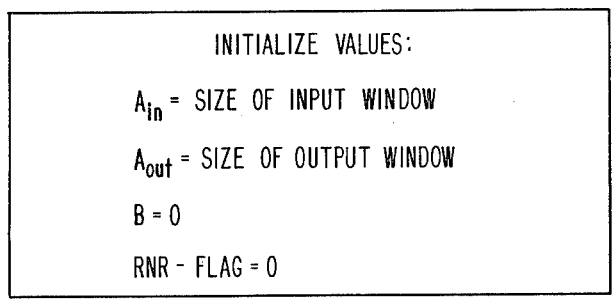
FIG. 3 depicts the important elements for initializing a window mechanism control process in accordance with this invention.
Figure 4:
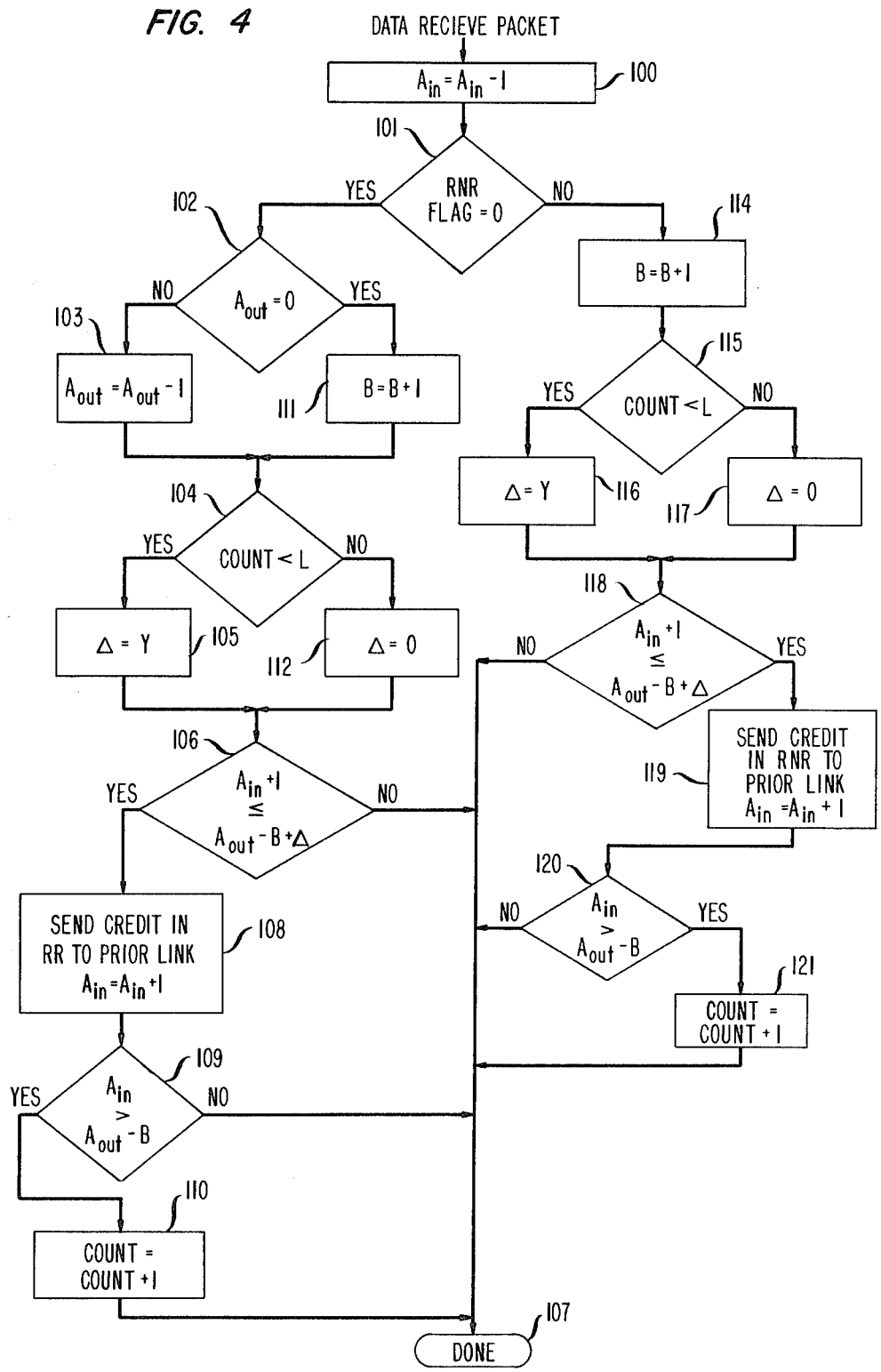
FIG. 4 discloses a flow diagram for a window mechanism control process routine which responds to reception of a data packet in accordance with this invention.
Figure 5:
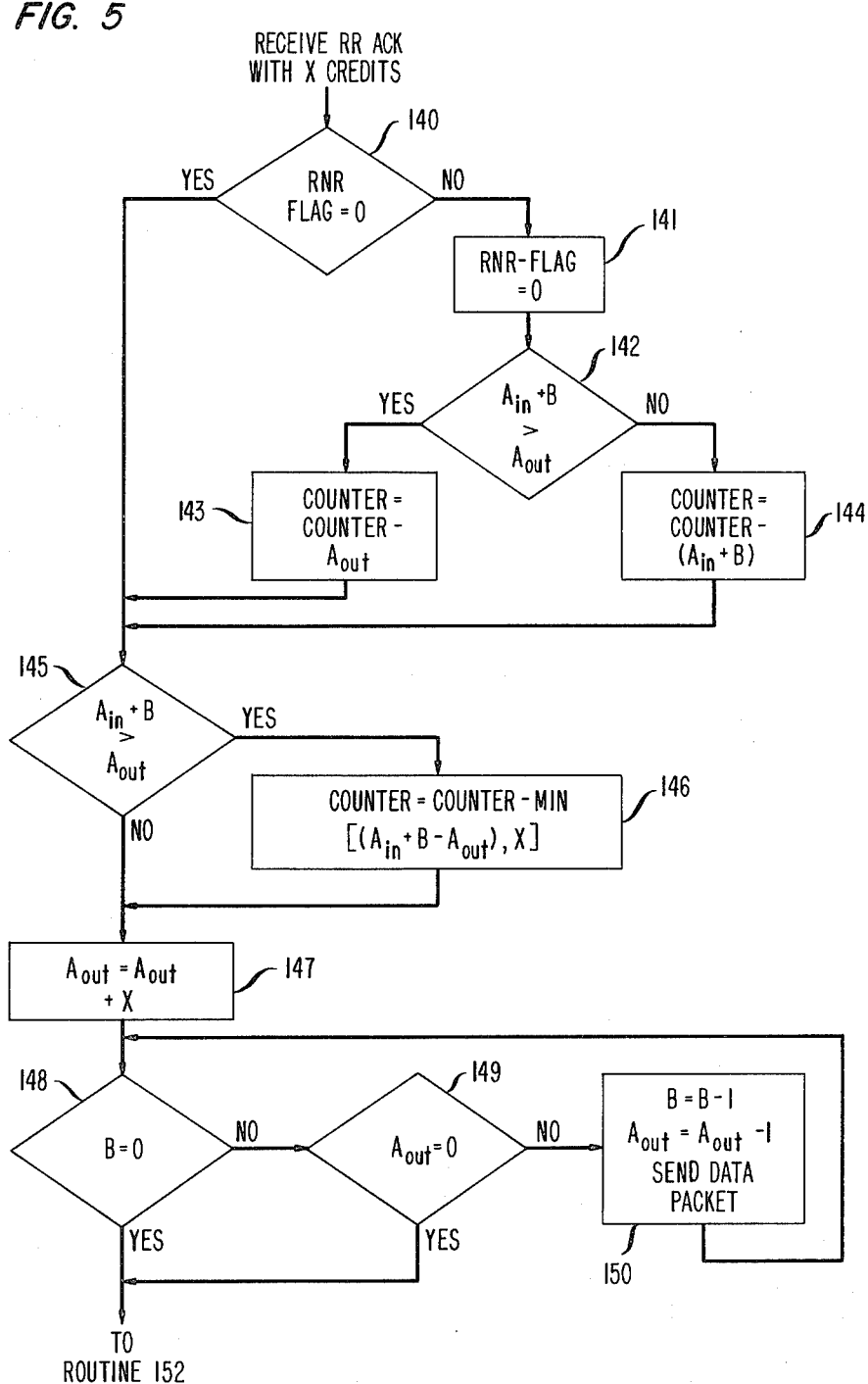
FIGS. 5 and 6, when vertically aligned, depict a flow diagram for a window mechanism control process routine which responds to reception of credits from a receiver unit in accordance with this invention.
Figure 6:
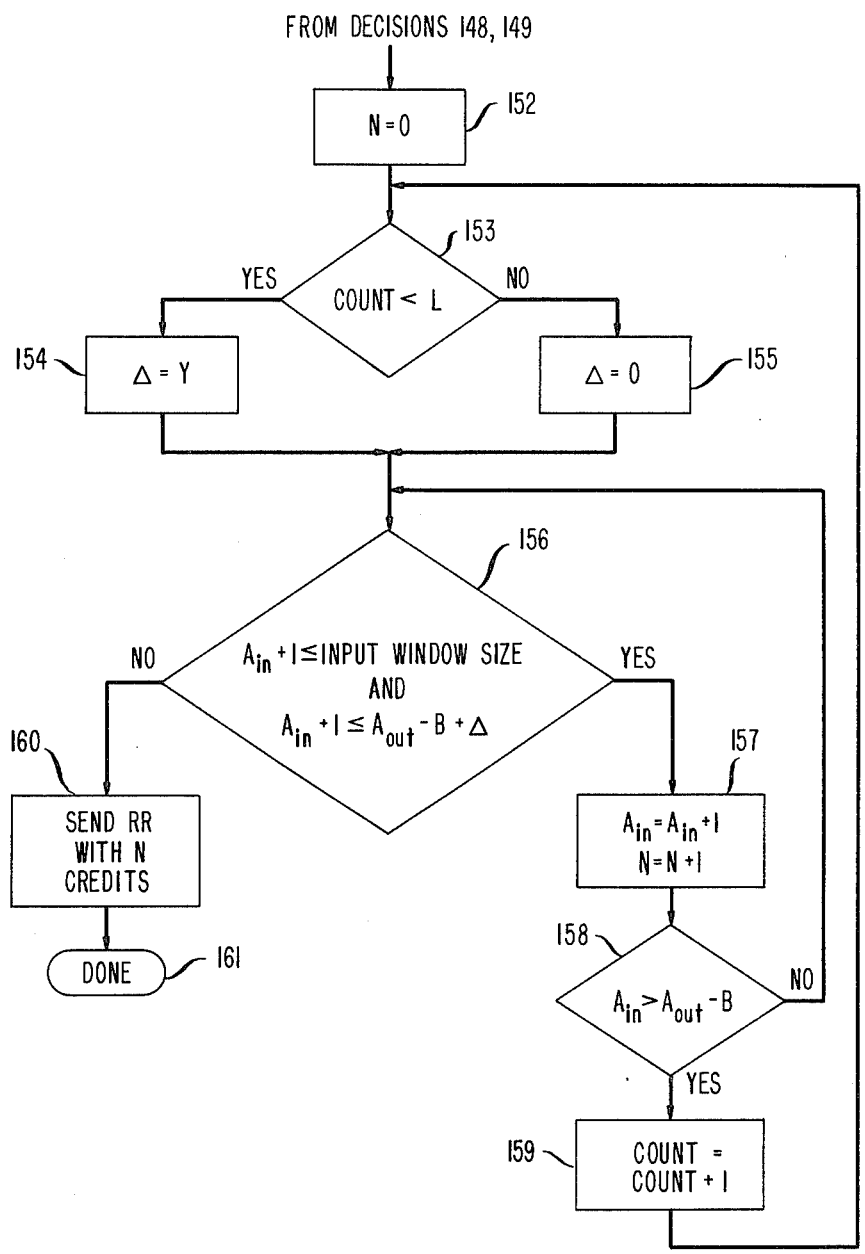

Other functions of processor 21 constitute recognizing whether or not receiving equipment in or terminating a particular circuit or path is ready or not ready to receive data thus defining a receiver ready (RR) mode or, alternatively, a receiver not ready (RNR) mode. Processor 21 is also arranged to reset credit counts in the event of an internal reset condition such as line failure and to clear the credit count when, for example, a call terminates. Accordingly, upon receipt of a call initiation or call setup packet by packet switch 13, the call processor 21 initializes certain parameters or values as shown in FIG. 3 by a routine 25 which sets $A_{in}$ to the size of the input window (the maximum number of credits that can be granted to the prior link), sets $A_{out}$ to the size of the output window, sets B to equal zero and sets up an RNR flag to equal zero to define a receiver ready mode.

Assume now that processor 21 of packet switch 13 has been initialized, a "call" has been made and the route selected and a data packet is received by packet switch 13 from the prior link on line 16 for this "call". The process of process 21 thereupon goes to routine 100 wherein $A_{in}$ (the number of credits granted to the prior link) is decremented by one and the process advances to decision 101. In decision 101 the process determines whether or not the RNR flag is equal to zero. In the event that the RNR flag does equal zero, the process advances to decision 102. In decision 102, the determination is made as to whether the number of credits granted to packet switch 13 by the output window ($A_{out}$) is equal to zero. In the event that the switch has credits to send packets to line 17, the credits are not equal to zero and the process advances to routine 103.

In routine 103, $A_{out}$ is decremented by one to thus reduce the output credits and processor 21 understands that there is an output credit to permit sending a data packet of the call onto the next link (line 17) in any manner conventional in the art. The process then advances to decision 104.

Returning now to decision 102, assume that $A_{out}$ equals zero indicating that no credits exist to forward a packet to the next link. The process advances to routine 111 where B is incremented by one to designate that the data packet is being processed through packet switch 13 without an authorization to leave. The process thereupon proceeds to decision 104.

In decision 104 with the newly decremented $A_{in}$ and the decremented $A_{out}$ or incremented B, a determination is made as to whether the new holding buffer and authorization count (using the above-identified equation (2)) is less than the upper limit L. This determines whether the newly received packet has added to the storage of common buffer 23 to the point that the upper maximum L has been reached. If, in fact, the holding buffer and authorization count is less than the limit L, the process advances to routine 105 where $\Delta$ is set to the maximum number of extra packets (Y) that buffer 23 may store for the call. The process thereupon advances to decision 106.

Assume now that the holding buffer and authorization count is not less than L. Decision 104 thereupon advances the process to routine 112 where $\Delta$ is set to zero to indicate lack of buffer room for subsequently received packets. With $\Delta$ set to zero, the process advances to decision 106.

In decision 106, a determination is made as to whether $A_{in}+1$ is equal to or less than $A_{out}-B+\Delta$. It is apparent that if $A_{in}+1$ is not less than or equal to $A_{out}-B+\Delta$, then the next packet from line 16 cannot be accommodated by switch 13 and no additional credits can be returned to the prior link and the process advances to step 107 wherein processor 21 halts the process and awaits further events.

Assume, however, that $A_{in}+1$ is less than or equal to $A_{out}-B+\Delta$ in decision 106. In this event, the process advances to routine 108. In routine 108, a credit is sent to the prior link in an RR acknowledgement packet in any conventional manner well known in the art. At the same time, $A_{in}$ is incremented to $A_{in}+1$. The process thereupon advances to decision 109.

In decision 109, a determination is made as to whether $A_{in}$ is greater than $A_{out}-B$. In other words, a determination is made as to whether the packet credit extended to the prior link has a corresponding credit for such packet to leave to the subsequent link. If such a credit to leave is available, $A_{in}$ is not greater than $A_{out} - B$ and the process advances to routine 107 where it retires until the next event occurs. If, in fact, no such credit is available, the holding buffer and authorization count is incremented by one in routine 110 to reserve a buffer for this next data packet and then the process advances to routine 107.

Returning now to decision 101, assume that the RNR flag is not equal to zero. This indicates that the subsequent link is not ready to accept packets for the circuit at this time for some reason not directly related to the flow control. The process thereupon advances to routine 114 where B is incremented by one since the packet being processed cannot be sent on to the next link. The process now advances to decision 115 which determines whether or not the holding buffer and authorization count is less than the limit L. If the count is less than the limit L, the process proceeds to routine 116 where $\Delta$ is set to Y [the maximum number of extra credits (buffers in common buffer 23) available for the circuit]. Alternatively, if the holding buffer and authorization count is not less than the limit L, the process advances to routine 117 where $\Delta$ is set to zero. In either event, whether the process advances to routine 116 or 117, it thereafter proceeds to decision 118.

In decision 118, it is determined whether $A_{in} + 1$ is less than or equal to $A_{out} - B + \Delta$. If $A_{in} + 1$ is not less than or equal to $A_{out} - B + \Delta$, a credit cannot be sent to the prior link and the process proceeds to routine 107 where it retires until another event occurs. Alternatively, if $A_{in} + 1$ is less than or equal to $A_{out} - B + \Delta$, the process advances from decision 118 to routine 119.

In routine 119, a credit is sent to the prior link in an RNR acknowledgement packet, which packet contains a flag or indication that the subsequent link is in a receiver not ready (RNR) condition. Additionally, in routine 119, $A_{in}$ is incremented by one and the process proceeds to decision 120.

In decision 120, it is determined if $A_{in}$ is greater than $A_{out} - B$. If this is the case, the process advances to routine 121 where the holding buffer and authorization count is incremented by one; whereas, if this is not the case, the holding buffer and authorization count is not incremented for reasons further stated hereinafter. In either event, the process advances to routine 107 where it retires awaiting the next event.

Assume now that a receive ready (RR) acknowledgement packet containing a number (X) of credits is received from the subsequent link (line 17). In decision 140 it is determined whether the RNR flag is equal to zero. In the event that the circuit is presently in an RNR condition and the flag is not equal to zero, the process advances to routine 141. In this routine the RNR flag is set to zero and the process proceeds to decision 142.

In decision 142, a determination is made as to whether $A_{in} + B$ is greater than $A_{out}$. If it is determined that $A_{in} + B$ is greater than $A_{out}$, the process advances to routine 143 where the holding buffer and authorization count is reduced or decremented by $A_{out}$. In the event that $A_{in} + B$ is not greater than $A_{out}$, the process advances to routine 144 where the holding buffer and authorization count is reduced or decremented by $A_{in} + B$. The reasons for performing routines 143 and 144 will be further explained hereinafter. In either event, the process then advances to decision 145. Alternatively, in decision 140, if the RNR flag is equal to zero, the process goes directly to decision 145.

In decision 145, it is determined whether $A_{in} + B$ is greater than $A_{out}$, that is whether or not the circuit has been overextended insofar as the number of credits for incoming data packets and the number of packets being processed exceed the number of credits for outgoing packets. If this be the case, the process advances to routine 146 wherein the holding buffer and authorization count is decremented by either $A_{in} + B - A_{out}$ or by the number of credits (X) received for the circuit from the subsequent link, whichever is less. This removes from the count the number of buffers either (a) reserved for incoming packets not having credits to leave or (b) corresponding to the newly received credits. The process thereupon advances to routine 147. Alternatively, in decision 145 if $A_{in} + B$ does not exceed $A_{out}$, the process advances directly to routine 147.

In routine 147 a new $A_{out}$ is formulated by incrementing $A_{out}$ with the number of incoming credits (X) from the prior link and the process thereupon advances to decision 148. In decision 148 a determination is made as to whether B equals zero to consider the situation where a data packet is being processed through data switch 13. If a packet is not being processed, B does not equal zero and the process advances to decision 149. In decision 149, it is determined if $A_{out}$ is or is not equal to zero and, if in this case $A_{out}$ does not equal zero, the process advances to routine 150. In routine 150, B is decremented by one and $A_{out}$ is decremented by one (since neither is at zero). The packet switch 13 at the same time is enabled to send a data packet to the subsequent link in the conventional manner and the process returns to decision 148. The above-described process is repeated and data packets are continued to be forwarded to the next link until either B becomes zero or $A_{out}$ becomes zero. In either event the process advances to routine 152.

In routine 152, a variable "N" which designates the number of credits which will be sent to the prior link is set to zero. The process thereupon advances to decision 153 where it is determined whether or not the holding buffer and authorization count is less than L. If the count is less than L, the process advances to routine 154 where $\Delta$ is set to Y. Alternatively, if the count is not less than L, the process advances to routine 155 where $\Delta$ is set to zero. The process then advances to decision 156.

In decision 156 it is determined if $A_{in} + 1$ is less than or equal to the input window size (indicating that additional credits may be sent to the prior link) and at the same time it is determined whether $A_{in} + 1$ is less than or equal to $A_{out} - B + \Delta$ (indicating that data switch 13 is not overextended). If both of these conditions are satisfied, the process advances to routine 157 where $A_{in}$ is incremented by one and N is incremented by one. The process thereupon goes to decision 158 where it is determined whether $A_{in}$ is greater than $A_{out} - B$. If, in fact, this is true, additional buffer space is required and the process advances to routine 159 where the holding buffer and authorization count is incremented by one. The process thereupon proceeds back to decision 153 and the entire series of steps is repeated. It is apparent that this is resulting in the incrementing of the holding buffer and authorization count and at the same time incrementing $A_{in}$ and N during each loop of the process.

Assume in decision 158 that $A_{in}$ is not greater than $A_{out} - B$. In this event, decision 158 advances the process back to decision 156 and the above-described steps starting with decision 156 are repeated. It is apparent that this loop has the effect of incrementing $A_{in}$ and N without effecting the holding buffer and authorization count.

When $A_{in}+1$ is no longer less than or equal to the input window size or $A_{in}+1$ is no longer greater than or equal to $A_{out}-B+\Delta$, decision 156 advances the process to routine 160. In routine 160, an RR (receiver ready) acknowledgement packet is forwarded to the prior link together with the notation that N credits as developed by the process is being granted to such prior link. The process then proceeds to routine 161 where it retires until the next event occurs.

Figure 7:
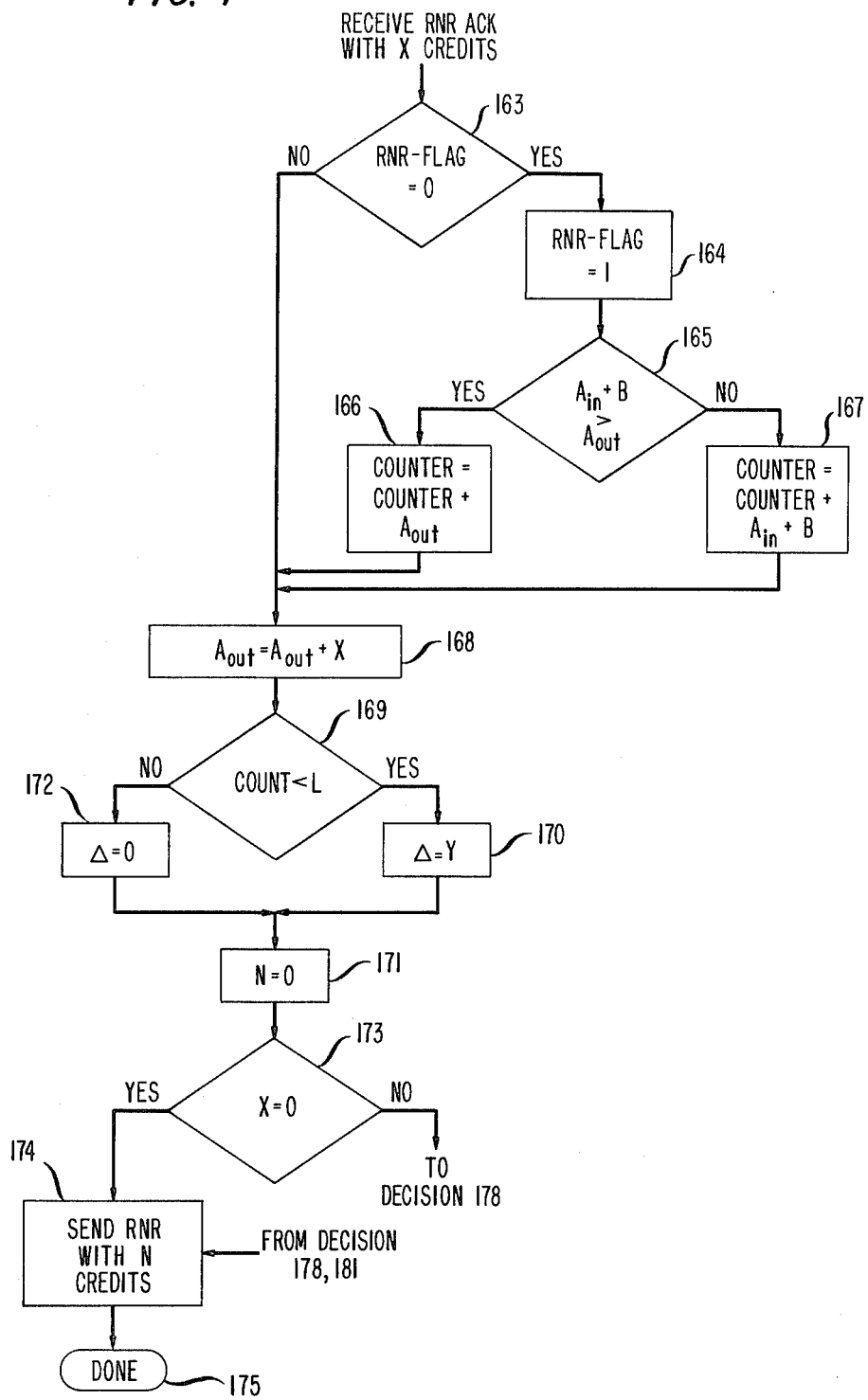
FIG. 7 and FIG. 8, when vertically aligned, show a flow diagram for a window mechanism control process routine which responds to reception of credits from a receiver unit in accordance with this invention.

Assume now that an RNR acknowledgement packet is received from the subsequent link. When this RNR acknowledgement packet is recognized, the process goes to decision 163 in FIG. 7. In decision 163, the determination is made as to whether or not the circuit is presently in the RNR mode, that is, whether the RNR flag is one or zero. If the circuit is presently in the RNR mode and the flag is zero, the process advances to routine 168. Alternatively, if the flag is zero, the process goes to routine 164.

In routine 164 the RNR flag is set to one and the process advances to decision 165. In this decision routine it is determined whether or not $A_{in}+B$ is greater that $A_{out}$. If, in fact, $A_{in}+B$ is greater, the process advances to routine 166. In routine 166, the holding buffer and authorization count is incremented by $A_{out}$, that is, incremented by the number of output credits for the circuit.

Alternatively, if decision 165 finds that $A_{in}+B$ is not greater than $A_{out}$, the process advances to routine 167. In routine 167, the holding buffer and authorization count is incremented by $A_{in}+B$, that is, incremented by the number of credits given to the incoming link plus the number of packets presently being processed. It is noted at this point that, in accordance with routines 166 and 167, buffer space has been reserved in common buffer 23 corresponding to either the number of outstanding credits granted by the subsequent link or the number of outstanding credits granted to the prior link plus the number of data packets being processed by packet switch 13, whichever is lesser. Common buffer 23 is thereby arranged to accommodate all data packets of the call which the switch may receive and not be able to forward to the subsequent link due to the receiver not ready condition. It is to be further noted that, when the RNR condition is removed, these buffered data packets will be forwarded since the credits have been granted by the subsequent link and the holding buffer and authorization count must be correspondingly decremented. This function of decrementing is provided by routines 143 and 144 as previously described.

When routine 166 or 167 is completed, the process goes to step 168, which as previously described, is also the routine that the process advances to if decision 163 finds the circuit in the RNR condition. In routine 168 the $A_{out}$ credits are incremented by the number of credits granted by the above-described RNR acknowledgement packet. The process then proceeds to decision 169.

In decision 169 it is determined whether the holding buffer and authorization count is less than the limit L. If the count is in fact less than the limit, the variable $\Delta$ is set to Y in routine 170 and the process advances to routine 171. Alternatively, if the holding buffer and authorization count is not less than the limit L, $\Delta$ is set to zero in routine 172 and the process correspondingly advances to routine 171. The variable N is then set to zero in routine 171. At this time the process goes to decision 173.

In decision 173 it is determined whether X (the number of credits granted in the incoming RNR acknowledgement packet) is equal to zero. If in fact the credits are equal to zero, the process advances to routine 174, at which time the acknowledgement packet is forwarded onto the preceding link and constitutes an RNR acknowledgement packet with zero additional credits being granted to the prior link by the input window. More specifically, routine 174 sets the number of credits to the variable N which, as described above, is presently equal to zero. The process then proceeds to routine 175 where it then retires until the next applicable event occurs.

Figure 8:
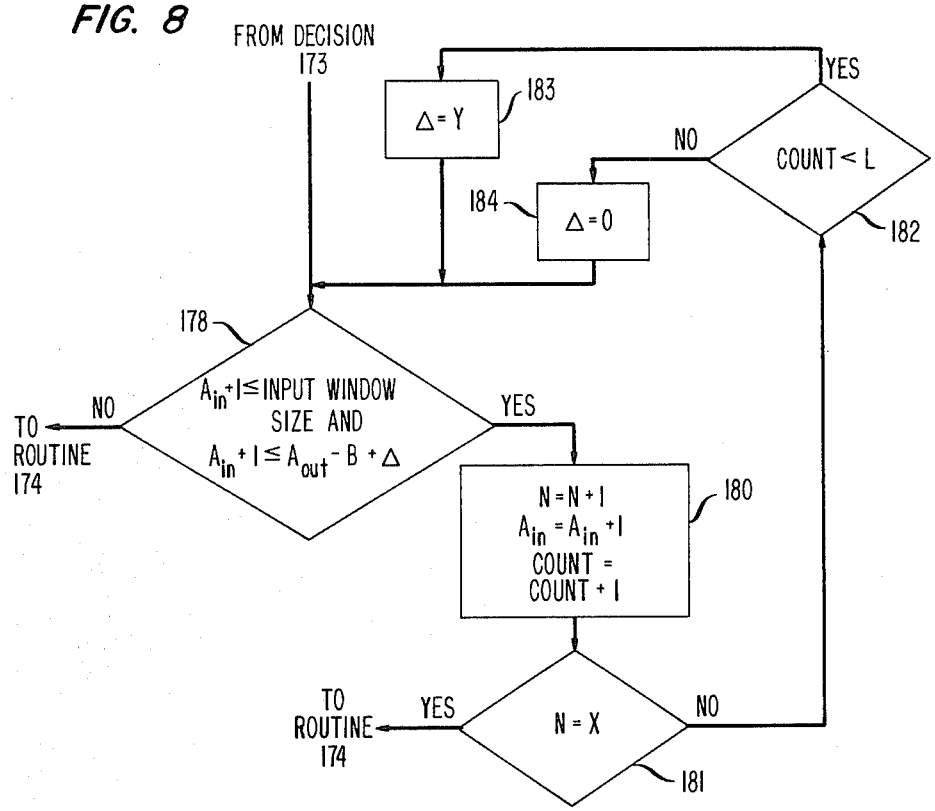

Assume now that in decision 173 it is determined that the number of credits (X) granted in the RNR acknowledgement packet does not equal zero. In this event, the process advances to decision 178, FIG. 8.

In decision 178 a determination is made as to whether $A_{in}+1$ is less than or equal to the input window size and it is further determined whether $A_{in}+1$ is less than or equal to $A_{out}-B+\Delta$. If either one or the other of these two conditions is not met, the process advances to routine 174 where, as previously described, an RNR acknowledgement packet is forwarded to the prior link with N credits being granted in the packet.

In the event in decision 178 it is determined that $A_{in}+1$ is less than or equal to the input window size (that is, the maximum number of credits that can be given out) and is also equal to or less than $A_{out}-B+\Delta$, then the process goes to routine 180. In routine 180 N is incremented by one and $A_{in}$ is incremented by one. In addition, the holding buffer and authorization count is incremented by one. The process then advances to decision 181.

In decision 181 it is determined whether N is equal to X. If in fact N equals X, the process goes to routine 174 wherein, as previously described, the RNR acknowledgement packet is sent to the prior link, granting N credits. Alternatively, if N does not equal X in decision 181, the process goes to decision 182.

In decision 182 it is determined if the holding buffer and authorization count is less than the limit L. If this count is less than the limit L, the process goes to routine 183 where $\Delta$ is set to Y. Alternatively, if the count is not less than L, the process goes to routine 184 where $\Delta$ is set to zero. In either event, the process loops back to decision 178 where the above-described sequence of decisions and routines are repeated. Accordingly, the process is repeated until either $A_{in}+1$ becomes greater than either the input window size or $A_{out}-B+\Delta$ in accordance with decision 178 or, alternatively, N becomes equal to X in accordance with decision 181 whereupon the looping terminates and the process goes to routine 174 which provides the setting of the RNR acknowledgement packet with N credits granted therein to the prior link. During each looping, however, $A_{in}$, N and the holding buffer and authorization count are incremented (as in the RR mode case) to maintain the appropriate counts of buffers and credits and return the appropriate number of credits.

Figure 9:
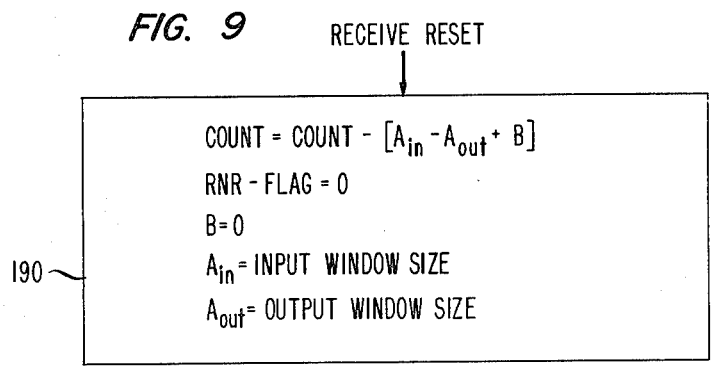
FIG. 9 depicts elements of a process for resetting a window mechanism control process in accordance with this invention.

In the event that there is a call or path failure, a "reset" packet is sent through the entire path in a conventional network in order to reset the several variables in the packet switches to initial conditions. In a network arranged in accordance with this invention, the resetting of these variables is arranged by routine 190 shown in FIG. 9. The routine includes a step to decrement the holding buffer and authorization count by a number corresponding to the number of packets that processor 21 indicates is being stored or held in common buffer 23. This is determined by subtracting the credits being granted by the output window and adding to this amount the number of packets being processed in the packet switch. This resultant amount is used to reduce the holding buffer and authorization count by an amount corresponding to credits given for this call (less credits received) plus data packets of this cell being processed. Other steps in the routine 190 involve setting the RNR flag to zero, setting the B variable to zero and restoring the credits for the input window and output window to the window size of each of these mechanisms.

Figure 10:
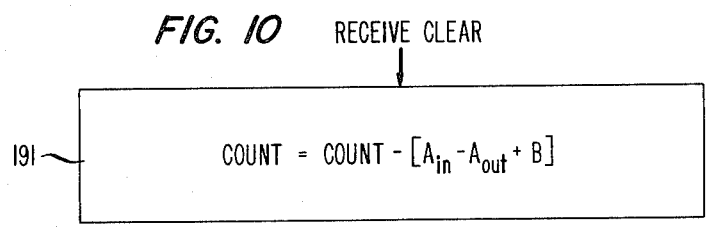
FIG. 10 depicts elements of a process for clearing a window mechanism control process in accordance with this invention.

At the termination of a call, a "clear" packet is received by the switch 13 and the various variables that processor 21 has calculated is maintained for the circuit or path except that the holding buffer and authorization count is decremented in the same manner as in routine 190. Specifically, as seen in routine 191 (FIG. 10), the count is reduced by a number derived from the difference between the credits granted by the input window and by the output window plus the number of packets in the path presently being processed through the packet switch.

Although a specific embodiment of this invention has been shown and described, it will be understood that various modifications may be made without departing from the spirit of this invention.

What is claimed is:

1. A method of controlling flow rate of data packets through a node on each of a plurality of paths extending from a plurality of sender units to a plurality of receiver units connected thereto through the node, the node being arranged to grant a number of node credits to each sender unit to permit such sender unit to send a corresponding number of data packets to the node, to forward a number of the data packets sent to the node toward the receiver unit connected thereto when holding a corresponding number of receiver credits granted by such receiver unit and to process the data packets from all sender units through shared resources of the node, comprising the steps of:

determining a quantity of node congestion in accordance with the quantity of packets from all sender units being processed through the shared resources, granting node credits to each individual one of the sender units limited in number to a selected number when the node congestion quantity exceeds a predetermined threshold, and granting a further number of node credits to the one sender unit in excess of the selected number when the node congestion quantity fails to exceed the threshold.

2. A method of controlling flow rate in accordance with claim 1 wherein the step of granting node receiver credits includes limiting the selected number to the number of node held credits granted by the receiver unit connected thereto.

3. A method of controlling flow rate in accordance with claim 1 wherein the step of determining node congestion quantity includes the step of increasing the determined quantity when granting a further number of node credits to the several sender units.

4. A method of controlling flow rate in accordance with claims 1 or 3 wherein the step of determining node congestion quantity includes the step of decreasing the determined quantity in response to receiver credits granted by the several receiver units.

5. A method of controlling flow rate in accordance with claim 2 wherein the step of granting node credits includes the step of determining a difference between the node held receiver credits granted by the receiver unit connected thereto and the quantity of packets from the one sender unit being processed through the node.

6. A method of controlling flow rate in accordance with claim 5 wherein the step of granting a further number of node credits includes the step of adding a predetermined integral number to the difference determination.

7. A method of controlling flow rates of data packets through a common node, the data packets flowing through a plurality of virtual circuits extending from sender units to receiver units connected thereto by way of the common node, activities of the node including granting node credits to each of the sender units, which node credits are satisfied by receiving packets from the sender units, sending packets to each of the receiver units to satisfy receiver credits granted by such receiver unit and processing packets received from sender units in anticipation of sending same to receiver units connected thereto, comprising the steps of:

granting a node credit to each individual one of the sender units when a number relating to a difference between the number of unsatisfied receiver credits granted by the receiver unit connected thereto and the number of packets from the one sender unit being processed in the node exceeds the number of unsatisfied node credits granted to the one sender unit, and adding an incremental number to the difference number when the quantity of node activity is below a predetermined threshold whereby a node credit is granted without the node holding a corresponding receiver credit for the sender unit packet that will satisfy the granted receiver credit.

8. A method of controlling flow rates in accordance with claim 7 and including the step of maintaining a count of node credits granted to all sender units without the receiver credits from the receiver unit connected thereto to determine quantity of node activity.

9. A method of controlling flow rates in accordance with claim 8 and including the step of decrementing the count in response to receiver credits granted by the receiver units.

* * * * *